United States Patent [19]
de Groot

[11] Patent Number: 6,011,624
[45] Date of Patent: Jan. 4, 2000

[54] GEOMETRICALLY-DESENSITIZED INTERFEROMETER WITH ADJUSTABLE RANGE OF MEASUREMENT DEPTHS

[75] Inventor: Peter de Groot, Middletown, Conn.

[73] Assignee: Zygo Corporation, Middlefield, Conn.

[21] Appl. No.: 09/003,449

[22] Filed: Jan. 6, 1998

[51] Int. Cl.[7] ........................................... G01B 9/02
[52] U.S. Cl. ..................... 356/355; 356/354; 356/359
[58] Field of Search ................................ 356/354, 359, 356/360, 355

[56] References Cited

U.S. PATENT DOCUMENTS

| | | | |
|---|---|---|---|
| 4,594,003 | 6/1986 | Sommargren . | |
| 4,732,483 | 3/1988 | Biegen | 356/359 |
| 5,526,116 | 6/1996 | De Groot | 356/354 |
| 5,598,265 | 1/1997 | de Groot . | |

OTHER PUBLICATIONS

Grating Interferometer for Flatness Testing, Optics Letters, vol. 21, No. 3, Feb. 1, 1996, Peter de Groot, pp. 228–230.

*Primary Examiner*—Robert H. Kim
*Attorney, Agent, or Firm*—Fish & Richardson P.C.

[57] ABSTRACT

A geometrically-desensitized interferometer (GDI) instrument incorporates a light generator, an optical assembly, an imaging device, and an adjustable mechanism for selectively altering the transmission of light through or the reception of light from the optical grating assembly so as to alter the operation of the GDI instrument. The adjustable mechanism may be disposed between the light generator and the optical assembly so as to at least selectively alter the effective lateral length of the light generator and hence selectively adjust the range of measurement depths of the instrument. The instrument therefore is selectively capable of operating in a high coherence mode, a low coherence mode, or in between. Instead of or in addition to a light generator adjustment mechanism, the adjustable mechanism could comprise an aperture which shapes light entering the imaging device so as to enhance the instrument's ability to profile objects with rough surfaces.

35 Claims, 6 Drawing Sheets

GEOMETRICALLY-DESENSITIZED INTERFEROMETER WITH ADJUSTABLE RANGE OF MEASUREMENT DEPTHS

BACKGROUND OF THE INVENTION

1. Field of the Invention

The invention relates to interferometers and, more particularly, relates to a geometrically-desensitized interferometer (GDI) instrument for surface profiling. Even more particularly, the invention relates to a GDI instrument having an adjustable range of measurement depths and to a method and apparatus for adjusting the range of measurement depths of a GDI instrument. The invention additionally relates to a GDI instrument incorporating measures to enhance the ability of the instrument's imaging device to profile rough surfaces by constraining reflected light to return to the imaging device.

2. Discussion of the Related Art

Optical metrology of surface profiles can generally be divided into two regimes, namely interferometric and geometric. Geometric techniques include triangulation and moiré fringe analysis, which involves the projection and imaging of a periodic structure such as a ronchi ruling. Geometric techniques are relatively insensitive to surface roughness and deformations, but are of relatively low resolution—so low, in fact, that they are unsuitable for many applications in which surface profiles must be measured with high precision.

Interferometry, on the other hand, relies on the wave nature of light to ascertain with high precision the surface profile of a test object. A typical traditional interferometer includes a light generator that generates a beam of light, a spatial filter-beam diverger that diverts the light beam into a diverging spherical wavefront, a beamsplitter that diverts part of the diverging spherical wavefront from the filtered beam, and a collimating lens that collimates the wavefront to produce a plano wavefront of coherent light. This wavefront of coherent light is then reflected off test and reference surfaces to produce first and second reflected wavefronts which combine with one another while interfering both constructively and destructively to produce an interference fringe pattern. An imaging device such as a solid state camera receives the recombined wavefronts and acquires images of the interference fringe pattern. The interference fringe pattern then is analyzed to obtain information about the surface profile of the test object.

Fringe pattern analysis for surface profilometery often is performed by the well-known technique of phase shifting interferometry (PSI). In PSI, the height difference between locations on a surface imaged by first and second pixels on the imaging device is determined by first determining a phase difference between light received at the first and second pixels and by then using the phase difference to calculate a height difference. A primary advantage of PSI is that it is highly precise. The vertical height precision for PSI is a fraction (e.g., $\frac{1}{100}$) of the optical wavelength of the light source used to conduct the measurement. A second advantage of PSI is that it has good vibration immunity characteristics because phase data is acquired for all pixels simultaneously and because the data acquisition time is relatively short.

Generally speaking, however, conventional PSI approaches can only profile smooth surfaces having relatively small height variations or "surface departures" between adjacent measurement sites. This constraint results from the fact that PSI has a phase ambiguity constraint. Specifically, the maximum physical departure between adjacent measurement sites on the profiled surface must be less than ¼ of the source wavelength. Stated another way, the maximum phase difference between the reference and test light beams must have an absolute value which is less than $\pi$. This constraint, sometimes known as "two $\pi$ ambiguity", arises because the arctangent function, which is used to convert phase to distance, is only unique within the range of $\pm\pi$. Thus, although the use of phase measurements advantageously allows very high precision to be obtained, it disadvantageously limits the maximum surface departure between adjacent measurement sites to one quarter of the source's optical wavelength. A further difficulty with PSI arises when the surface slope is so large that it becomes difficult to resolve or distinguish the interference fringes because the fringe density is too high. Therefore, while PSI interferometetry is much more precise than geometric optical profilometery, it historically has been considered to be ill-suited for use with rough objects or objects having marked surface deformations. Interferometers using PSI analysis therefore historically have not been considered appropriate for some surface profilometery applications.

One interferometric technique that lacks the quarter-wavelength constraint of PSI is the so-called scanning white light interferometry or SWLI. In SWLI, a white light illumination source or, more generally, one which is of a broad-band as opposed to being of a narrow-band generates an interference pattern which contains regions of high contrast for each location on the test surface as a function of scan position. The scan position of high contrast for a given pixel indicates the height of the corresponding location on the test surface. Therefore, by comparing the temporal characteristics of these regions of high contrast with one another, a difference in height between two locations on the profiled surface can be determined. Unlike PSI, SWLI does not calculate height differences based on phase differences, and the PSI phase constraint therefore does not apply to SWLI. The maximum physical departure between adjacent measurement sites on a profiled surface therefore may be much larger with SWLI than with PSI.

However, SWLI has disadvantages of its own that hinders its use in industrial applications. For instance, the field of view is generally no larger than can be accommodated by standard microscope objectives. To function correctly, the imaging device of the instrument must have high resolution when compared to the corresponding interference fringe density. When the field of view of the typical SWLI instrument is increased, the fringe density can easily become difficult to resolve even with very high resolution imaging devices. This problem is especially evident during the profiling of rough surfaces. Moreover, slope tolerance for specular surfaces decreases linearly with the field size, and the speckle effects required for rough-surface measurements are only resolvable if the numerical aperture (NA) of the objective decreases linearly as the field increases. The need to resolve the speckle pattern from rough surfaces is the most discouraging, since the amount of collected light decreases with the square of the NA. The light loss means that larger surfaces require a more powerful illuminator. Worse, the fringe contrast is now a highly variable parameter, and the quality of the measurement depends critically on the balance between the reference and object beam intensities.

Another disadvantage of typical SWLI techniques is that data acquisition is very slow. The slow speed is a consequence of the rapidly varying interference effect as a function of scan position. Accurate measurements require that these variations be recorded in detail, usually at the rate of one measurement per pixel per 75 nm of scan motion. The slow speed creates additional problems such as a high sensitivity to thermal distortions and mechanical strain during measurement.

Still another disadvantage of typical SWLI is its high sensitivity to vibration, which is due in part to the slow data acquisition speed, and in part to the extremely high sensitivity of the interference fringe pattern, which is easily corrupted by very small amounts of vibration. An instrument configured for SWLI analysis generally requires massive mounting fixtures and expensive vibration isolation. Even with these precautions, such instruments are still restricted to relatively vibration-free environments as compared to normal production environments.

Recent years have seen an increased demand for the high speed, high precision metrology of the surface profiles of manufactured parts having large surface departures, i.e., having rough surfaces or surfaces with pronounced surface deformations. A corresponding demand has arisen for the acquisition of data during production as opposed to in the laboratory. For instance, precision products such as hard disks for computer disk drives need to be profiled with high precision, at high speeds, and under conditions in which the test object may be subjected to substantial vibrations during manufacturing processes. Neither traditional PSI techniques nor traditional SWLI techniques are suitable for these purposes. A need therefore has developed for a "desensitized" interferometer that is relatively insensitive to surface roughness and surface deformations, that performs surface metrology with high accuracy and at high speeds, and that is relatively insensitive to vibrations and therefore is well-suited to production-line use.

This need has been met to a large extent by the development of the geometrically-desensitized interferometer (GDI) instrument. A GDI instrument is characterized by the replacement of the beam splitter of the traditional instrument with an optical assembly located between the collimating lens and the test object. The optical assembly, which typically (but not necessarily) comprises a diffraction grating assembly, a hologram, or diffractive optics in combination with conventional optics such as mirrors and lenses, divides the collimated source light into two beams which propagate in two different directions and impinge on the profiled surface at the same location but at different incident angles. The beams reflect from the profiled surface and pass back through the optical assembly in different directions, after which they are recombined. Constructive and destructive interference of the reflected and recombined beams form an interference fringe pattern having an equivalent wavelength A that may be orders of magnitude larger than the source wavelength. As a result, the GDI instrument is much less sensitive to height variations and surface deformations than are traditional interferometers using PSI analysis techniques. Some forms of GDI instruments also are achromatic. That is, the fringe spacing in an interference fringe pattern produced by a GDI instrument is independent of the source wavelength. As a result, and unlike with SWLI interferometers, there is no coherence envelope associated with the source bandwidth. Many disadvantages associated with SWLI such as a limited field of view, a slow acquisition speed, and a high sensitivity to vibration therefore are avoided. The sensitivity of GDI instruments is intermediate conventional interferometry and moire fringe analysis, and is comparable to that obtained with grazing-incidence interferometry. GDI instruments therefore can be used in manufacturing applications and other applications that are unsuitable for traditional interferometry.

A characteristic of GDI instruments is that they exhibit a noticeable decline in fringe contrast with an increase in the effective lateral length of the source light, i.e., in the physical dimension of the source light in a direction which extends laterally along the plane of the optical assembly. As a result, the range of distances from the light generator to the test surface over which a contrast intensity of a minimum acceptable threshold exists varies inversely with the effective lateral length of the source light. Stated another way, the equivalent coherence envelope is inversely proportional to the effective lateral length of the source light. A GDI instrument generating a relatively physically narrow source light can tolerate substantial changes in the distance between the test surface and the optical assembly while retaining acceptable fringe contrast. A GDI instrument generating a relatively wide source light is relatively intolerant of variations in distance between the test surface and the optical assembly.

Since the effective lateral length of the source light varies directly with the effective lateral length of the light generator's discharge aperture, conventional wisdom might be to design a GDI instrument so as to minimize as much as practical the effective lateral length of the discharge aperature, thereby maximizing the width of the equivalent coherence envelope and the effective range of measurement depths. However, it has been discovered that situations exist in which a relatively narrow equivalent coherence envelope and a resultant relatively small range of measurement depths are desirable. These applications include profiling only one surface of an optically transparent element and differentiating between a feature of interest on a test surface such as a groove and an adjacent feature that is separated from the feature of interest by a substantial vertical distance. However, applications in which low coherence operation is desirable are few in comparison to applications in which high-coherence operation is desirable, and designing a GDI instrument specifically for low coherence operation therefore is impractical. Moreover, even if a GDI instrument were designed uniquely for low coherence operation, it would be impossible to switch back and forth between low coherence mode and high coherence mode for focusing or similar operations.

Another problem associated with many optical instruments and even with many GDI instruments is that they may experience difficulty profiling a surface that is so rough that it scatters reflected light to such an extent that the instrument's imaging device cannot generate images with acceptable contrast for interferometric analysis. This problem could be ameliorated if a mechanism were available to in some way constrain reflected light to travel back to the imaging device so as to optimize coherence in the image. No such devices have heretofore been available.

OBJECTS AND SUMMARY OF THE INVENTION

It is therefore a principal object of the invention to provide a geometrically-desensitized interferometer (GDI) instrument which incorporates measures to shape light traveling to or from the instrument's optical assembly to improve the versatility of the instrument.

In accordance with a first aspect of the invention, this object is achieved by providing a geometrically-desensitized interferometer comprising a light generator, an optical assembly which is disposed between the light generator and the object surface and which is arranged to receive light from the light generator at a range of incident angles $\Delta\gamma$ relative to a line extending perpendicularly with respect to the optical assembly, and an imaging device which is disposed on a common side of the optical assembly with the light generator and which is arranged to receive light transmitted through the optical assembly by the light generator and reflected back through the optical assembly by the object surface so as to produce an interference pattern having a number of equivalent wavelength fringes. An aperture-bearing element is disposed between the optical assembly and one of the light generator and the imaging device and has an aperture formed therein which shapes light traveling there through. The aperture has an effective lateral length with respect to the line. An adjustment mechanism is selectively operable to adjust the effective lateral length of the aperture and hence to adjust operation of the instrument.

Another object of the invention is to provide a GDI instrument which is capable of being operated in either a high coherence mode or a low coherence mode so as to have an adjustable range of measurement depths.

This object is achieved by incorporating a mechanism into the GDI instrument that selectively adjusts the lateral length of the source light. In one embodiment of the invention, the aperture-bearing element comprises a discharge element of the light generator, the aperture comprises a discharge aperture of the light generator, and the magnitude of $\Delta\gamma$ is dependent upon the effective lateral length of the light generator discharge aperture. The magnitude of $\Delta\gamma$ is inversely related to the effective lateral length of the light generator discharge aperture. In this case, the adjustment mechanism is operatively coupled to the discharge element so as to selectively rotate the discharge element.

Another object of the invention is to provide a GDI instrument which meets the first object of the invention and in which changeover from high coherence mode to low coherence mode can be performed simply and with minimal hardware.

In accordance with another aspect of the invention, this object is achieved by using a rotatable knob to effect aperture length adjustment.

Another object of the invention is to provide a GDI instrument which is capable of accurately profiling objects with surfaces that are so rough that they hamper the ability of the instrument's imaging device to image interfering wavefronts reflected from the surface.

In accordance with another aspect of the invention, an instrument is provided which is constructed generally as described above and in which the aperture-bearing element is disposed between the optical assembly and the imaging device. This aperture shapes light entering the aperture from the optical assembly to constrain the light to travel to the imaging device. In this case, the adjustment mechanism selectively removes the aperture-bearing element from the path of the light entering the imaging device.

Still another object of the invention is to provide a method of selectively adjusting the range of measurement depths of a GDI instrument.

In accordance with still another aspect of the invention, this object is achieved by transmitting light (1) from a discharge aperture of a light generator and onto an optical assembly at a range of incident angles $\Delta\lambda$ with respect to a line extending perpendicularly with respect to the optical assembly, (2) through the optical assembly, (3) to a surface of an object as two beams that impinge on a test object surface at a common location but at different incident angles, (4) back through the optical assembly, and (5) to an imaging device as an interference pattern having a number of equivalent wavelength fringes which is dependent on the magnitude of $\Delta\gamma$. An additional step comprises altering the magnitude of $\Delta\gamma$, the number of equivalent wavelength fringes, and the effective coherence depth of the interferometer.

Preferably, the light generator discharge aperture has an effective lateral length relative to the line extending perpendicularly with respect to the optical assembly, and the magnitude of $\Delta\gamma$ is dependent upon the effective lateral length of the light generator discharge aperture. In this case, the altering step comprises increasing the magnitude of $\Delta\gamma$ by reducing the effective lateral length of the light generator discharge aperture. For instance, if the light generator discharge aperture comprises an elongated slot which is formed in a discharge element of the light generator, then the altering step may comprise rotating the discharge element to vary the orientation of the elongated slot relative to the normal.

Other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

A geometrically-desensitized interferometer (GDI) instrument incorporates a light generator, an optical assembly, an imaging device, and an adjustable mechanism for selectively altering the transmission of light through or the reception of light from the optical assembly so as to enhance the versatility of the GDI instrument. The adjustable mechanism may be disposed between the light generator and the optical assembly so as to at least selectively alter the effective lateral length of the source light and hence to selectively adjust the range of measurement depths of the instrument. The instrument therefore is capable of selectively operating in a high coherence mode or a low coherence mode. Instead of or in addition to a source light adjustment mechanism, the adjustable mechanism could comprise an aperture which shapes light entering the imaging device so as to enhance the instrument's ability to profile objects with rough surfaces.

2. Use of a Light Generator Variable Geometry Aperture to Adjust Effective Coherence Depth The invention involves the adjustment of the effective lateral length of at least one of 1) the source light traveling to the optical assembly of a GDI instrument from the light generator of that instrument, and 2) the light reflected to an imaging device of the GDI instrument from the optical assembly. Mechanisms for effecting these two adjustments may be used singly or in combination with one another. By way of explanation only, two embodiments are disclosed herein in which the first embodiment incorporates only a mechanism for adjusting the effective lateral length of the light beam source transmitted to the optical assembly and in which the second embodiment incorporates both a first mechanism for selectively adjusting the effective lateral length of the light source being transmitted to the optical assembly and a second mechanism for selectively adjusting the effective lateral length of the reflected light traveling to the imaging device from the optical assembly. It should be understood that these mechanisms or other mechanisms performing the same or equivalent functions could be mixed and matched in any desired manner.

a. GDI instrument structure

Figure 1:
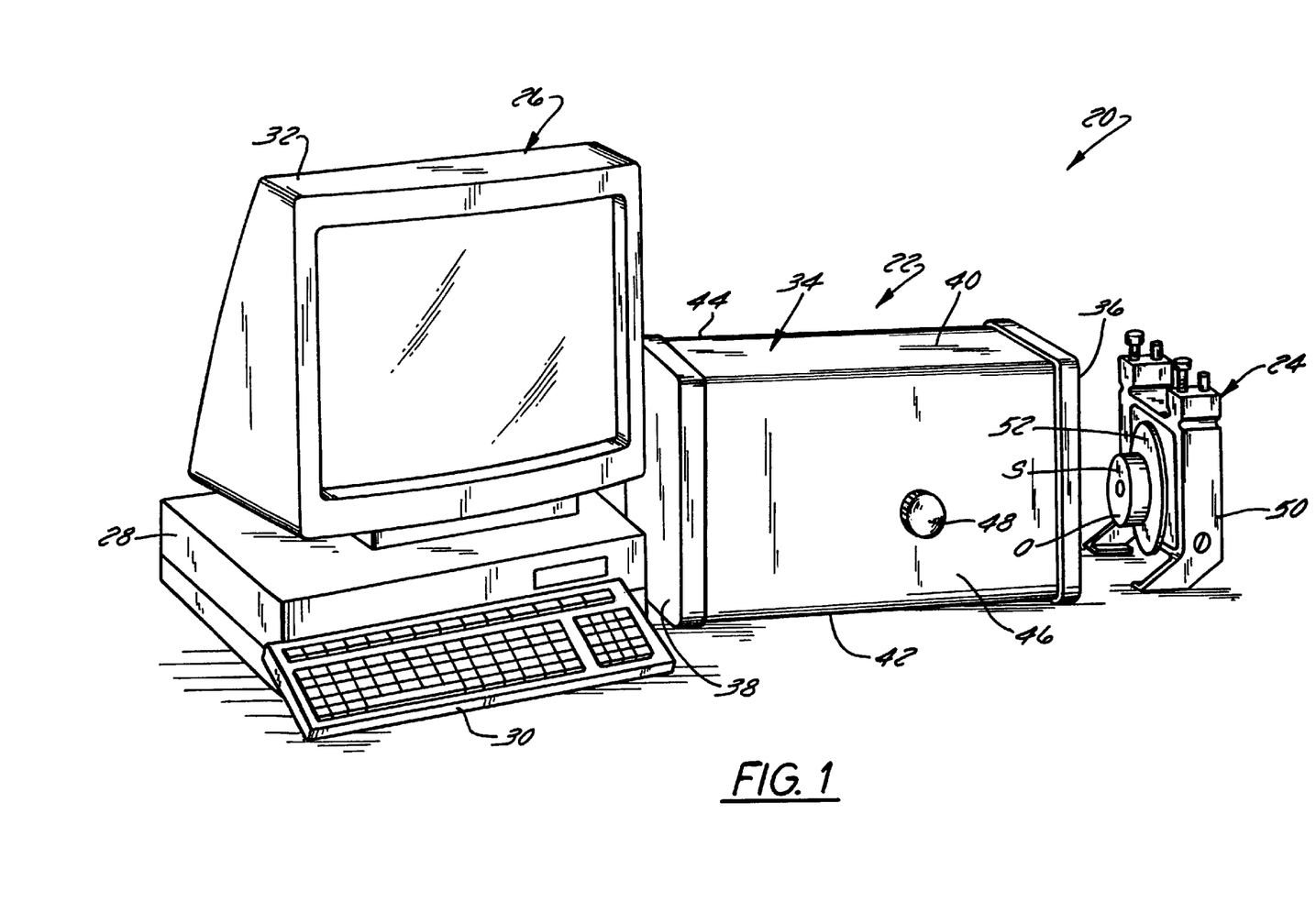
FIG. 1 is a perspective view of a geometrically-desensitized interferometer (GDI) instrument constructed in accordance with a first preferred embodiment of the present invention.

Referring now to FIGS. 1–6, and initially to FIG. 1 in particular, a GDI instrument 20 constructed in accordance with a first preferred embodiment of the invention includes a mainframe 22, a test object support stand 24, and a computer 26. The computer 26 is coupled to at least the mainframe 22 and, in the illustrated embodiment in which the object support stand 24 includes a scanning stage 54 (detailed below), is also coupled to the scanning stage to control the displacement of the test object O towards and away from the mainframe 22.

The computer 26 may comprise any general purpose programmable computer capable of controlling operation of the mainframe 22 and/or of the scanning stage 24. The computer 26 includes a casing 28 that houses a processor, a RAM, a ROM, etc., a keyboard 30 for entering data, and a monitor 32. The computer 26 could be replaced by an internal electronic processor that is disposed within the mainframe casing 34 and that performs all of the data manipulation functions of the computer 26. In this case, display functions would be performed by a stand-alone monitor coupled directly to the mainframe 22.

The mainframe 22 comprises an enclosed casing 34 in which the operative components of the GDI instrument (detailed below) are housed. The casing 34 includes front and rear end walls 36 and 38, a top side wall 40, a bottom side wall 42, a left side wall 44, and a right side wall 46. An adjustment knob 48 is rotatably mounted on and extends outwardly from the right side wall 46 for adjusting the effective lateral length of the light generator discharge aperture as detailed below. An opening (not shown) in the front wall 36 of the mainframe casing 34 facilitates transmission and reception of light.

The test object support stand 24 may comprise any structure capable of supporting a test object O in a position in which a surface S to be profiled receives light transmitted from the mainframe 22 and reflects light back to the mainframe 22. The support stand 24 may be separated from the mainframe 22 as illustrated or, alternatively, may be operatively and/or physically coupled to the mainframe 22 to form an assembly. In the illustrated embodiment, the support stand 24 includes a stationary base 50, a support bed 52, and a scanning stage 54 (FIG. 2) which couples the support bed 52 to the base 50. The scanning stage 54 is disposed so as to displace the bed 52 and the object O in a direction substantially perpendicularly to the surface S for focusing purposes or for the purpose of depth scanning. Depth scanning is detailed in U.S. Pat. No. 5,598,265 to P. de Groot DeGroot, the subject matter of which is hereby incorporated by reference for its disclosure of depth scanning using a GDI instrument.

Figure 2:
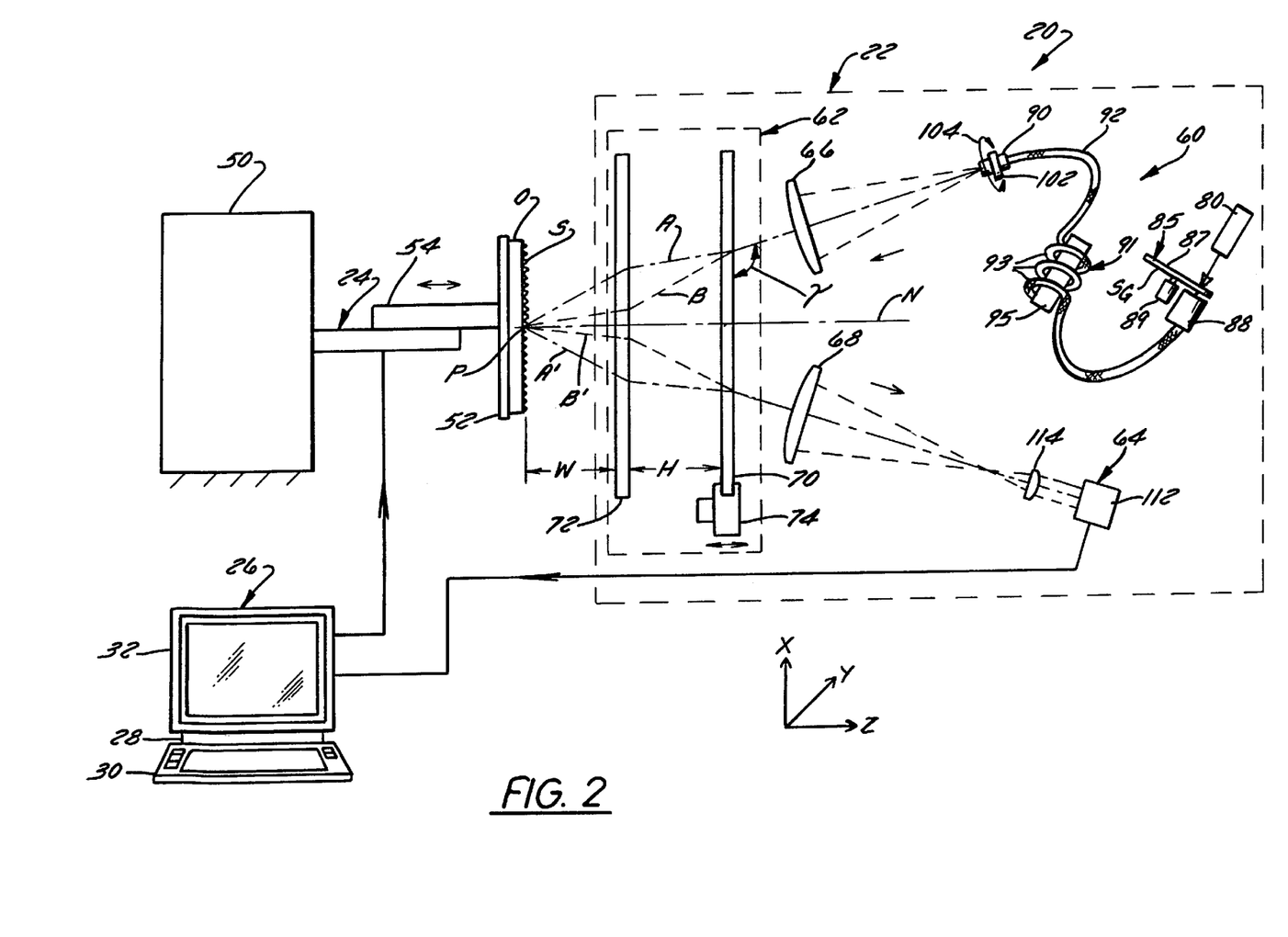
FIG. 2; schematically represents the operative components of the GDI instrument of FIG. 1.

Referring now to FIG. 2, the operative components of the GDI instrument include a light generator 60 which generates light, an optical assembly 62 which receives and diffracts light, and an imaging device 64. A collimating lens 66 is disposed between the light generator 60 and the optical assembly 62 to collimate the light entering the optical assembly 62 from the light source 60. A similar lens 68 is disposed between the optical assembly 62 and the imaging device 64.

The purpose of the optical assembly 62 is to increase the equivalent wavelength of the light generator 60 so as to desensitize the instrument to $2\pi$ ambiguities and other problems associated with traditional interferometers and hence to enhance the instrument's ability to perform profile metrology on rough surfaces. The optical assembly 62 could comprise a hologram, a system of lenses, or any other structure that splits a beam of light from the light generator 60 into two converging beams A and B that impinge on the profiled surface S of the test object O at the same location P but at different incident angles. The preferred optical assembly 62 comprises a diffraction grating assembly having one or more diffraction gratings, and the assembly 62 will henceforth be referred to as a "diffraction grating assembly" for the sake of convenience.

The illustrated diffraction grating assembly 62 includes first and second parallel linear gratings 70 and 72 that extend in respective XY planes (where the Y axis extends into and out of the page in FIG. 2 and the X axis extends vertically in FIG. 2) and that are spaced from one another in a Z direction or horizontally in FIG. 2. The second grating 72 typically (but not necessarily) has a grating frequency twice that of the first grating 70. In the illustrated embodiment, the first grating 70 has a grating frequency of 250 lines per millimeter, and the second grating 72 has a grating frequency of 500 lines per millimeter. The second grating 72 produces the advantage of permitting the working distance W between the output of the diffractive grating assembly 62 and the profiled surface S of the test object O to be increased from zero to virtually any selected distance by setting an appropriate spacing H between the first and second gratings 70 and 72.

The GDI instrument 20 of the illustrated embodiment also incorporates measures to induce a phase difference between light received at two pixels of the imaging device 64 in order to permit analysis of the interference fringe patterns by PSI. Phase shifting usually is achieved by varying the optical path of the test light beam during image acquisition. This variation is achieved in the illustrated embodiment by a transducer 74 that is controlled by the computer 26 to move the first grating 70 in the Z direction in FIG. 2. Transducer 74 can be eliminated entirely if the scanning stage 24 is capable of moving the profiled surface S so as to permit PSI analysis, if phase shifting is achieved by source wavelength modulation, or if data analysis other than PSI is utilized.

Referring now to FIGS. 2–6, the light generator 60 could comprise any light source and accompanying structure commonly used in GDI instruments so long as, in accordance with the present embodiment, it incorporates a mechanism for varying the range of incident angles Ay at which light impinges on the diffraction grating assembly 62. For instance, the light generator 60 could comprise a line shaped light generator such as a linear LED array. Alternatively, a large light source could be utilized in conjunction with an adjustable diaphragm. However, in the illustrated and currently-preferred embodiment, the light generator 60 includes a narrow-band light source 80 and a fiber optic bundle 82 configured to transmit light as efficiently as practical from the light source 80 to the diffraction grating assembly 62. A diode laser is preferred as the light source 80 because diode lasers are inexpensive when compared to many other lasers yet provide bright illumination for rough surfaces.

Figures 3, 4:
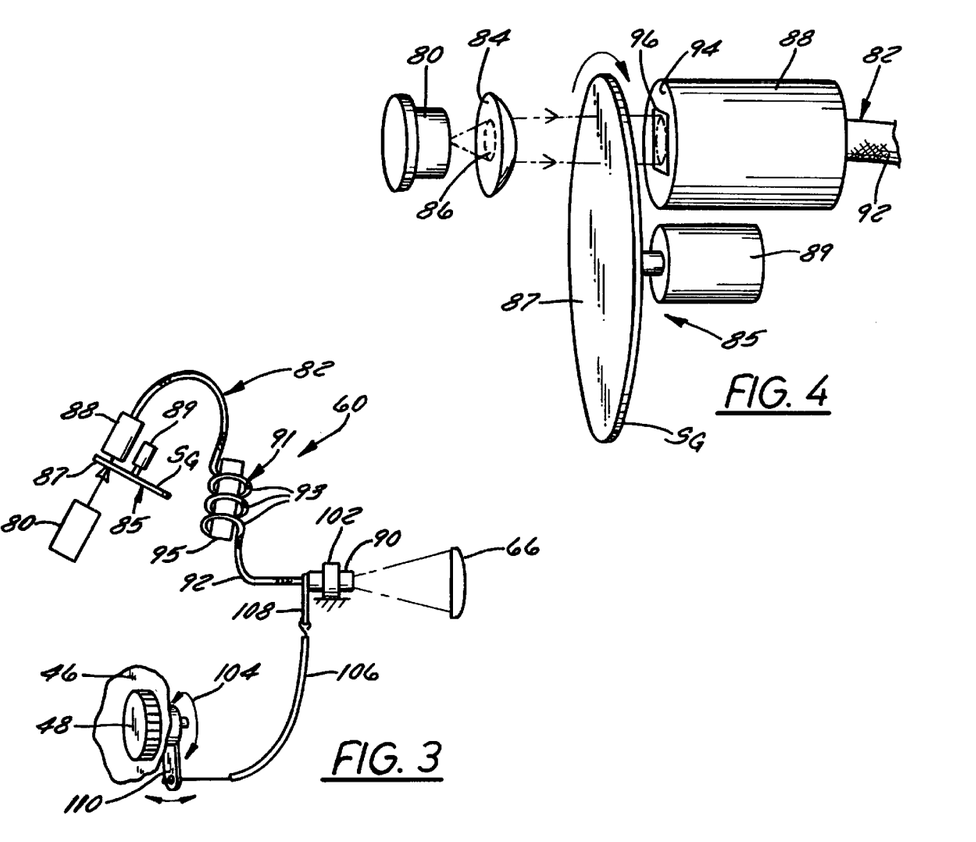
FIG. 3 is a partially schematic perspective view of a light generator of the GDI instrument of FIGS. 1 and 2.
FIG. 4 is a perspective view of the light source of the light generator of FIG. 3 and of the inlet end of the associated fiber optic bundle.
Figure 5:
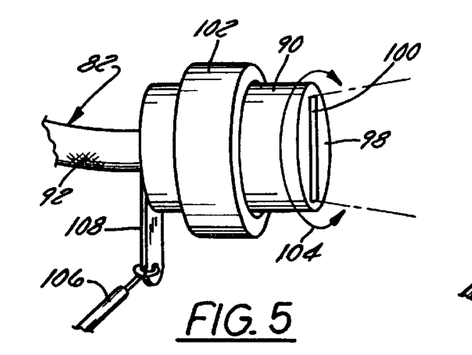
FIG. 5 is a perspective view of the outlet end of the fiber optic bundle of FIG. 3 and illustrates a discharge aperture of the fiber optic bundle of FIGS. 3 and 4 in a first orientation in which the effective lateral length of the discharge aperture is relatively small.
Figure 6:
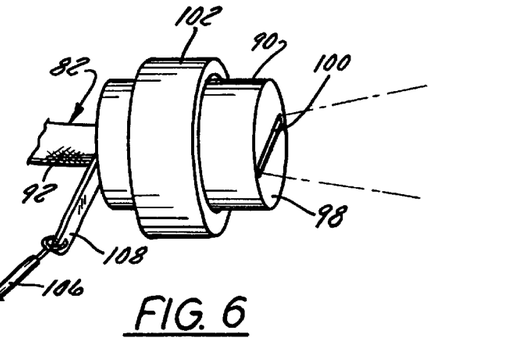
FIG. 6 corresponds to FIG. 5 but illustrates the discharge aperture in a second orientation in which the effective lateral length of the discharge aperture is relatively large.

A small focusing lens 84 is disposed between the discharge aperture of the light source 80 and the fiber optic bundle 82 to define an effective light source discharge aperture 86. The effective discharge aperture 86 preferably is relatively long and narrow so as to exhibit a high aspect ratio. The illustrated effective discharge aperture 86 is generally rectangular and is about 1 millimeter wide by 10 millimeters long so as to have an aspect ratio of about 10:1.

It may be desirable under some circumstances to enhance the randomization of the light distribution from the light source 80 by introducing a coherence buster or speckle randomizer 85 (best seen in FIG. 4) into the light generator 60 in order to break up the spatial coherence of the light source 80 over the time scale of the imaging device 64. Light distribution randomization enhancement is particularly useful when the light source 80 comprises a laser because laser light tends to generate a bothersome speckle pattern which degrades the quality of the interference pattern. Light distribution enhancement can be achieved by placing the speckle randomizer 85 at either the entrance or the exit of the fiber optic bundle 82. In the illustrated embodiment, the speckle randomizer 85 is disposed at the entrance end of the fiber optic bundle 82 and comprises a circular diffusion element 87 that is driven to rotate at a few hundred RPM by an electric motor 89. The diffusion element 87 is composed of a ground glass disc having a ground surface $S_G$. The surface $S_G$ is located sufficiently close to a fiber optic bundle inlet element 88 (detailed below) to assure efficient transmission of the randomized light into the inlet element 88 but sufficiently far away from the inlet element 88 to permit the diffusion element 87 to rotate without rubbing against the inlet element 88. A spacing of about 1 mm is preferred.

The fiber optic bundle 82, which may be a "multimode fiber bundle", includes the inlet element 88, a discharge element 90, and a plurality of optical fibers (not shown) disposed in cladding 92 and connecting the inlet element 88 to the discharge element 90. The inlet element 88 has an inlet face 94 bearing an inlet aperture 96 that should be shaped so as to maximize the efficiency of light transfer into and through the fiber optic bundle 82 from the lens 84 and light source 80. Therefore, the inlet aperture 96 should have a size and shape that at least substantially match the size and shape of the effective discharge aperture 86 of the light source 80. This arrangement achieves a transmission efficiency of over 60%, i.e., over 60% of the light emitted from the light source 80 is transmitted into and through the fiber optic bundle 82. Without matching apertures in this manner, the transmission efficiency would drop dramatically with a commensurate drop in illumination capability and imaging capability. Transmission efficiency may be enhanced further by mechanically polishing the inlet face 94, mechanically positioning the inlet face 94 relative to the effective discharge aperture 86, or a combination of both so as to minimize the reflection of light back to the light source 80 from the inlet face 94.

The individual fibers of the fiber optic bundle 82 have different propagation modes due to their different geometries and orientations relative to the fiber optic bundle inlet. In order to enhance the uniformity of the output beam of the fiber optic bundle 82 and to reduce the dependence of the output beam on the manner in which the light is directed into the fiber optic bundle 82 from the source 80, a mode mixer 91 (best seen in FIG. 3) preferably is incorporated into the light generator 60 to mix the propagation modes within the fiber optic bundle 82 by introducing some bending into the fiber optic bundle 82. Propagation mode mixing is could be achieved via a variety of devices including a commercial mode mixer. In the illustrated and preferred embodiment, the mode mixer 91 is formed by wrapping a section of the fiber optic bundle 82 in a plurality of coils 93 about a suitable mandrel such as a cylinder 95. The number and diameter of the coils 93 are selected so as to maximize mode mixing without significantly reducing light transmission efficiency through the fiber optic bundle 82. The coiled section of the illustrated embodiment includes four-to-five coils 93 each having a diameter of about 1.5 cm.

The discharge element 90 is coupled to the optical fibers and has a discharge face 98 in which is formed a discharge aperture 100 of the light generator 60. The discharge aperture 100 preferably, but not necessarily, is non-rectangular (e.g., generally elliptical or diamond-shaped) in shape in order produce an intensity of the emitted light beam that is a maximum at the center and that tapers gradually towards the edges and hence to produce a smooth coherence envelope. The same effect could be achieved by placing an attenuator downstream of the aperture 100. The discharge element 90 is adjustable in position or otherwise configured to permit selective alteration of the effective lateral length of the discharge aperture 100 in order to adjust the range of measurement depths of the GDI instrument 20 in a manner detailed in Subsections 2b and 2c below. In the illustrated embodiment, this effect is achieved by altering the orientation of the discharge aperture 100 relative to the diffraction grating assembly 62 by rotation as detailed below. The discharge aperture 100 is much longer than it is wide so as to maximize the potential for varying its effective lateral length and hence for varying the measurement depth range. The illustrated discharge aperture 100 has 1) a length of between about 5 millimeters and about 10 millimeters, and even more preferably of about 7.5 millimeters and 2) a width of between about 0.1 millimeters and about 1.0 millimeters, and even more preferably of about 0.5 millimeters. Of course, configurations other than the illustrated generally rectangular configuration are possible, so long as rotation of the discharge element 90 alters the effective lateral length of the discharge aperture 100. It is also conceivable that the range of incident angles Ay can be adjusted by operations other than altering the effective discharge aperture geometry.

The orientation of the discharge aperture 100 relative to the diffraction grating assembly 62 preferably is altered by rotating the discharge element 90. Towards this end, the discharge element 90 is mounted in a fixed collar 102 so as to be rotatable with respect to the collar 102 but so as to be incapable of moving axially or radially. As a result, a beam of light emitted from the discharge aperture 100 is constrained to travel through the diffraction grating assembly 62 at an angle y with respect to the z direction, e.g., with respect to a line N extending perpendicularly or normal to the XY planes in which diffraction grating assembly 62 extends. As can be appreciated from a comparison of FIGS. 5 and 6, rotation of the discharge element 90 within the collar 102 in the direction of the arrow 104 in FIGS. 3 and 5 varies the orientation of the discharge aperture 100 between 1) a first orientation in which the longitudinal portion of the aperture 100 extends in the X direction, thereby maximizing the effective lateral length of the aperture 100 and 2) a second orientation in which the longitudinal portion of the aperture 100 extends perpendicularly from the X direction or in the Y direction (out of the page in FIG. 2), thereby minimizing the effective lateral length of the discharge aperture 100. This rotation is effected via the knob 48 which, as illustrated in FIG. 3, is coupled to the discharge element 90 by a cable 106, a first link 108 affixed to the discharge element 90, and a second link 110 affixed to the knob 48. The cable 106 transfers rotational motion of the knob 48 to the first link 108 so that the discharge element 90 rotates proportionally to the rotational movement of the knob 48 with a resultant change in the effective lateral length of the discharge aperture 100.

The imaging device 64 may comprise any device or system capable of receiving the interfering beams or wavefronts from the diffraction grating assembly 62 and of producing images of the resulting interference pattern. The illustrated and preferred imaging device is a solid state device such as a charge coupled device (CCD) 112 and a small imaging lens 114 which collimates light input to the CCD 112.

In use, the light generator 60 of the GDI instrument 20 generates a beam of light which is collimated by the lens 66 before impinging on the first diffraction grating 70 of the diffraction grating assembly 62 at an incident angle $\gamma$. The first grating 70 diffracts the incident beam into two first order beams A and B. These beams are then redirected by the second grating 72 so that they impinge on the profiled surface S of the object O at the same location P but at different incident angles. Beams A' and B' reflect from the profiled surface S and travel back through the second and first gratings 72 and 70 so as to recombine with constructive and destructive interference. The interfering beams or wavefronts then are collimated by the lens 68 and imaged by the imaging device 64. The imaged interference fringe pattern is then analyzed by the computer 26, e.g., by a PSI analysis to obtain a precise profile measurement.

b. Theory of operation

As discussed above, the GDI instrument 20 has an equivalent coherence envelope the width of which varies with the effective lateral length of the source light. The effective lateral length of the source light varies directly with variations in the effective lateral length of the discharge aperture 100. The reasons for and effects of the relationship between equivalent coherence envelope width and effective discharge aperture lateral length now will be detailed for the GDI instrument 20. For the sake of convenience, the equations which follow are derived for a GDI instrument having a rectangular discharge aperture 100. While Equations 2–14 derived in this Section would change for a GDI instrument having a non-rectangular discharge aperture such as an elliptical aperture, the basic conclusion, i.e., that the equivalent coherence envelope width varies inversely with the effective discharge aperture lateral length, would not change for apertures of other shapes. The equations which follow therefore are not to be considered limiting.

Referring now to FIGS. 7–10, for small incident angles $\gamma$ (e.g., $\gamma \leq 30°$), the equivalent wavelength $\Lambda$ of the GDI instrument 20 can be estimated by the formula:

$$\Lambda \approx \frac{1}{2N_1 \sin(\gamma)} \qquad (1)$$

where:

$N_1$ is the grating frequency of the first diffraction grating 70.

The source wavelength does not appear in Eq. (1). Experimental observations confirm that fringe spacing does not vary significantly with color and that the GDI instrument 20 therefore is achromatic. Therefore, with white light illumination, the instrument can generate hundreds of clear, colorless images. The instrument 20 therefore does not have a coherence envelope directly related to the source spectrum. It does, however, have an equivalent coherence envelope related to the equivalent wavelength $\Lambda$. The invention lies in the adjustment of the width of this equivalent coherence envelope (preferably by adjustment of the effective lateral length of the discharge aperture 100 through the rotation of the discharge element 90) to adjust the range of the GDI instrument's measurement depth.

The equivalent coherence envelope of a GDI instrument 20 is a result of the superposition of many interference patterns having different fringe densities. The width of the equivalent coherence envelope can be determined by recognizing that GDI has much in common with SWLI or scanning white light interferometry. For instance, an equivalent wavenumber K can be defined as:

$$K = 2\pi/\Lambda \approx 4\pi N_1 \gamma \qquad (2)$$

where:

$\Lambda$ is the equivalent wavelength of the instrument's light source; and $\gamma$ is the incident angle on or from the diffractive grating assembly 62.

Figure 7:
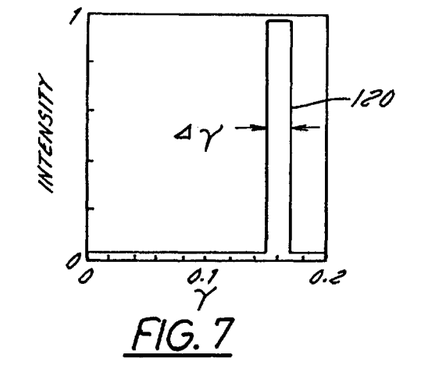
FIG. 7 is a graph of intensity versus wavelength for the GDI instrument of FIGS. 1 and 2.
Figure 8:
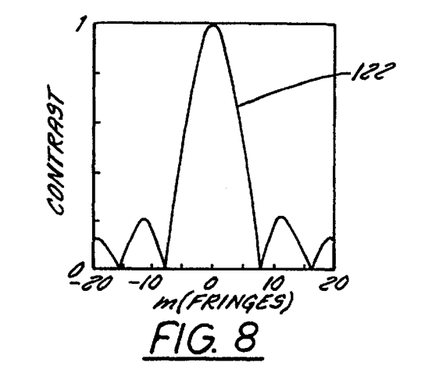
FIG. 8 is a graph of fringe contrast versus number of fringes for the GDI instrument of FIGS. 1 and 2.

An extended light generator actually has a range $\Delta\gamma$ of incident angles that results in a "spectrum" of equivalent wavelengths that reduces fringe contrast as represented by the Curve 120 in FIG. 7. The range $\Delta\gamma$ is centered at an average incident angle $\gamma_o$. Hence:

$$\Delta\gamma/2 < \gamma - \gamma_o < \Delta\gamma/2 \qquad (3)$$

A range $\Delta K$ of equivalent wavenumbers therefore can be considered to exist:

$$-\Delta K/2 < K' < K/2 \quad (4)$$

where:

$$K = K' + K_o; \text{ and}$$

$$K_o = 4\pi N_1 \gamma_0$$

The intensity pattern for two-beam interference for a single equivalent wavenumber can be considered:

$$I(K) = \theta + \theta \cos(KL) \quad (5)$$

where, for a normalized source intensity $I_0$, $$\theta = I_0/\Delta K; \text{ and}$$

L is the optical path difference (OPD).

All of the interference patterns I can be summed over the entire range $\Delta K$ to ascertain the total intensity $I_T$:

$$I_T = \int_{-\Delta K/2}^{\Delta K/2} I(K' + K_0) dK' \quad (6)$$

This Equation (6) can be rewritten as:

$$I_T/I_0 = 1 + \frac{1}{\Delta K}\int_{-\Delta K/2}^{\Delta K/2} \cos[(K' + K_0)L] dK' \quad (7)$$

Next, using the identity:

$$\cos(a+b) = \cos(a)\cos(b) - \sin(a)\sin(b) \quad (8)$$

and recognizing $K_0$ as a constant, then Eq.(7) reduces to the following:

$$I_T = I_0 + I_0 V \cos(K_0 L) \quad (9)$$

where:

$$V = \frac{\sin(\Delta KL/2)}{\Delta KL/2};$$

the absolute value of V is the fringe contrast; and

V approaches zero when the argument of the sin term approaches $\pm\pi$. Thus, V=0 when a normalized OPD $(L_0) = 2\pi/\Delta K$.

The number $m_o$ of equivalent-wavelength fringes at a normalized OPD of $L_0$ therefore is:

$$m_0 = L_0/\Lambda \quad (10)$$

Thus, at an OPD of $L_0$ $$m_0 = 2\pi/\Lambda\Delta K \quad (11)$$

Recombining Equations 1–11, one reaches the remarkably simple result:

$$m_0 = 2\gamma_0/\Delta\gamma \quad (12)$$

Equation 12 reveals that, for a uniform distribution of incident angles, the total number of fringes $m_0$ within the equivalent coherence envelope is equal to twice the ratio of the average incident angle $\gamma_0$ to the range of incident angles $\Delta\gamma$.

The range of incident angles $\Delta\gamma$ is directly related to and determined by the lateral length $\Delta x$ of the discharge aperture 100 together with the focal length f of the large illumination collimator or collimating lens 66. Hence, $$\Delta\gamma = \Delta x/f \quad (13)$$

Equation 13 therefore can be rewritten as:

$$m_0 = \frac{2\gamma_0 f}{\Delta x} \quad (14)$$

Equation 14 therefore reveals that, at constant values of f and $\gamma_0$ (as would be the case in a typical GDI instrument), the number of equivalent-wavelength fringes $m_o$ at a given OPD varies inversely with respect to the effective lateral length $\Delta\gamma$ of the discharge aperture 100. Hence, the width of the equivalent coherence envelop and, accordingly the range of measurement depths of a GDI instrument 20, varies inversely with the effective lateral length of the light generator discharge aperture 100.

Figure 9:
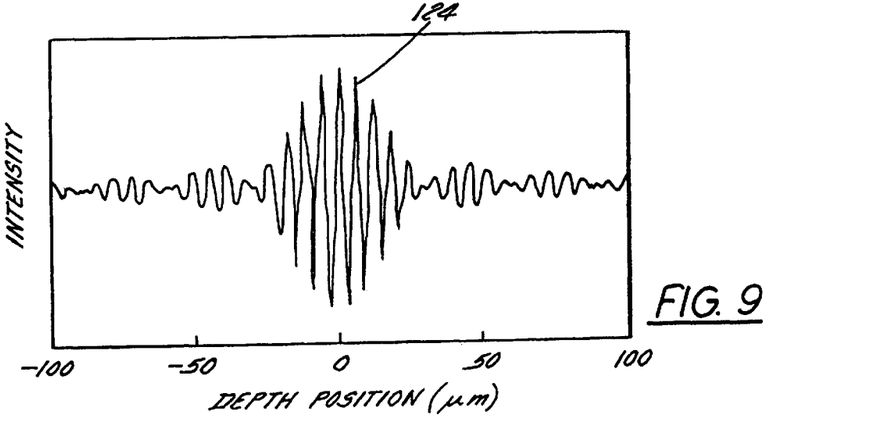
FIGS. 9 and 10 are graphs of intensity versus depth position or range of depth for the GDI instrument of FIGS. 1 and 2, with FIG. 9 graphing intensity for a configuration in which the instrument is set for low coherence or a small range of measurement depths, and with FIG. 10 graphing intensity for a configuration in which the instrument is set for high coherence or a large range of measurement depths.

As an example, for a light generator having a discharge aperture effective lateral length $\Delta x$ of 9 mm and an objective focal length f of 450 mm, the range of incident angles $\Delta\gamma = \frac{1}{50}$. If the average or nominal incident angle $\gamma_o = 0.16$ rad (9°), then the number $m_0$ of equivalent wavelength fringes will extinguish at $\pm 8$ fringes from the zero OPD position (i.e., the position at which the profiled surface S is spaced from the diffractive grating assembly 62 by the distance W in FIG. 2) as represented by the Curve 122 of FIG. 8. The curve 124 of FIG. 9 illustrates that intensity drops off to near zero within about 30 $\mu$m from the zero OPD position. An instrument having a relatively large effective lateral source dimension therefore has a rather small equivalent coherence envelope.

Figure 10:
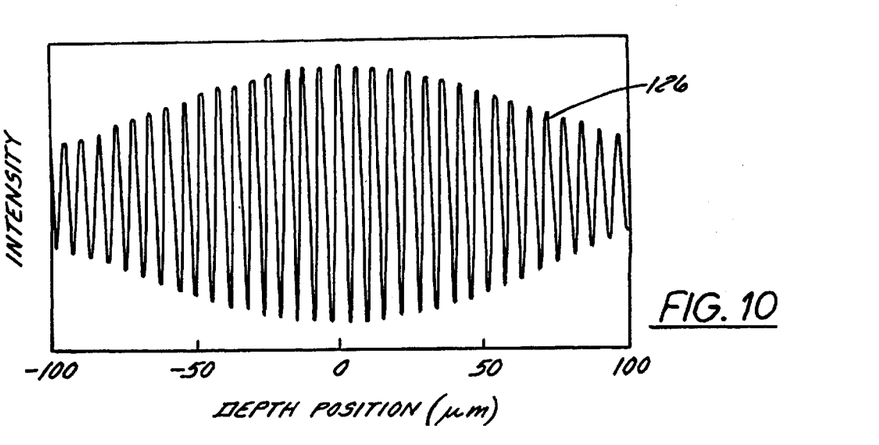

If, on the other hand, the effective lateral length $\Delta x$ of the discharge aperture 100 is relatively small (for example, $\Delta x = 1$ mm), then equivalent wavelength fringes will still be found at over $\pm 70$ fringes from the zero OPD position as is illustrated by the curve 126 of FIG. 10. An instrument having these characteristics therefore has a relatively wide equivalent coherence envelope and, accordingly, has a wide range of measurement depths.

Hence, by adjusting the effective lateral length of the light generator discharge aperture 100 by rotation of the knob 48 or otherwise, the range of measurement depths can be varied dramatically and with high precision. This adjustment could be configured to be either discrete or continuous simply by setting the rotational capacity of the knob 48. The instrument 20 could be set for discrete adjustment between a high coherence mode and a low coherence mode simply by providing only two detents or other operational positions for the knob 48—one for each mode. The instrument 20 could be configured for continuous adjustment simply by eliminating detents or the equivalents altogether or by adding additional detents between those corresponding to the high coherence mode and the low coherence mode.

c. Practical applications

Several practical applications for a GDI instrument operable in low coherence mode (with a small range of measurement depths) and/or in high coherence mode (with a large range of measurement depths) now will be described.

One useful application for low coherence mode operation is the profiling of a transparent or partially-transparent object. Traditional interferometers experience difficulty in profiling transparent objects because spurious reflections from the surface opposed to the profiled surface contribute to the interference effect and hinder fringe analysis. Operation in low coherence mode can eliminate the effects of the spurious reflections on the analysis by positioning the object O such that only the profiled surface S is within the equivalent coherence envelope of the instrument 30 and the far or opposed surface S' of the object O is disposed outside of the equivalent coherence envelope. As a result, the interference fringe patterns being analyzed are produced solely by the profiled surface S. Hence, adjusting the measurement depth eliminates the need to physically reposition the test object O relative to the instrument 20 to position the opposed surface S' beyond the instrument's measurement range.

Selective operation in low coherence mode can also be useful for focusing operations. As discussed above, an optimum distance W for maximum contrast exists between the profiled surface S of the object O and the diffractive grating assembly 62. If one does not know this distance W in advance, the instrument 20 can be set in low coherence mode so that high-contrast fringes will appear only for a small range of movement of the test object O in the Z direction relative to the mainframe 22. If the operator positions the test object O such that the surface S is within this relatively small envelope, he will have a good indication that the object O is positioned at or very near the optimal spacing W from the diffraction grating assembly 62. The operator can then operate the knob 48 to switch the instrument 20 back to its high coherence mode for surface profiling.

Still another example in which selective operation in low coherence mode is desired is the profiling of a particular feature of interest of a surface S having a pronounced spacing in the Z direction between the feature of interest and its surrounding features. For instance, if one wishes to profile a groove in the surface S of an object O, such as a computer hard disk without profiling adjacent features on the surface S, the knob 48 can be operated to reduce the effective lateral length of the source aperture 100 and thereby to place the instrument 20 in low coherence mode. The scanning stage 24 then is actuated to place the object O in a position in which the surface of the groove is within the relatively narrow equivalent coherence envelope and the surrounding features are located outside of that envelope. Interference fringes of acceptable contrast therefore will occur only when the groove is being profiled. If the scanning stage 24 is then actuated to place the groove outside of the equivalent coherence envelope and the surrounding features within the equivalent coherence envelope, the groove and the surrounding features can be profiled sequentially. A single image of the entire surface S also could be acquired using the same instrument 20 simply by operating the knob 48 to place the instrument 20 back in its high coherence mode so that both the groove and the surrounding features can be profiled without translating the test object O in the Z direction.

3. Use of Imagining Device Variable Geometry Aperture to Improve Metrology of Rough Surfaces Rough surfaces, i.e., surfaces having discrete height variations or surface departures of more than one quarter-wavelength of the light source, exhibit a challenge to interferometric profilometry because they scatter reflected light so that the imaging device receives insufficient light to produce images of high contrast. It has been discovered that Eqs. (12)–(14) hold true for the imaging aperture as well as the source aperture. Hence, the effective width of the imaging device's equivalent coherence envelope (and hence the ability of the imaging device to construct images of suitable contrast from diffuse light and other light of lower-than-peak intensity) varies inversely with the effective lateral length of the imaging device inlet aperture. The invention takes advantage of this phenomenon by the selective use of an elongated imaging aperture to improve the ability of the imaging device to obtain images of rough surfaces by constraining the reflected light to follow a path leading to the imaging device 64

Figure 11:
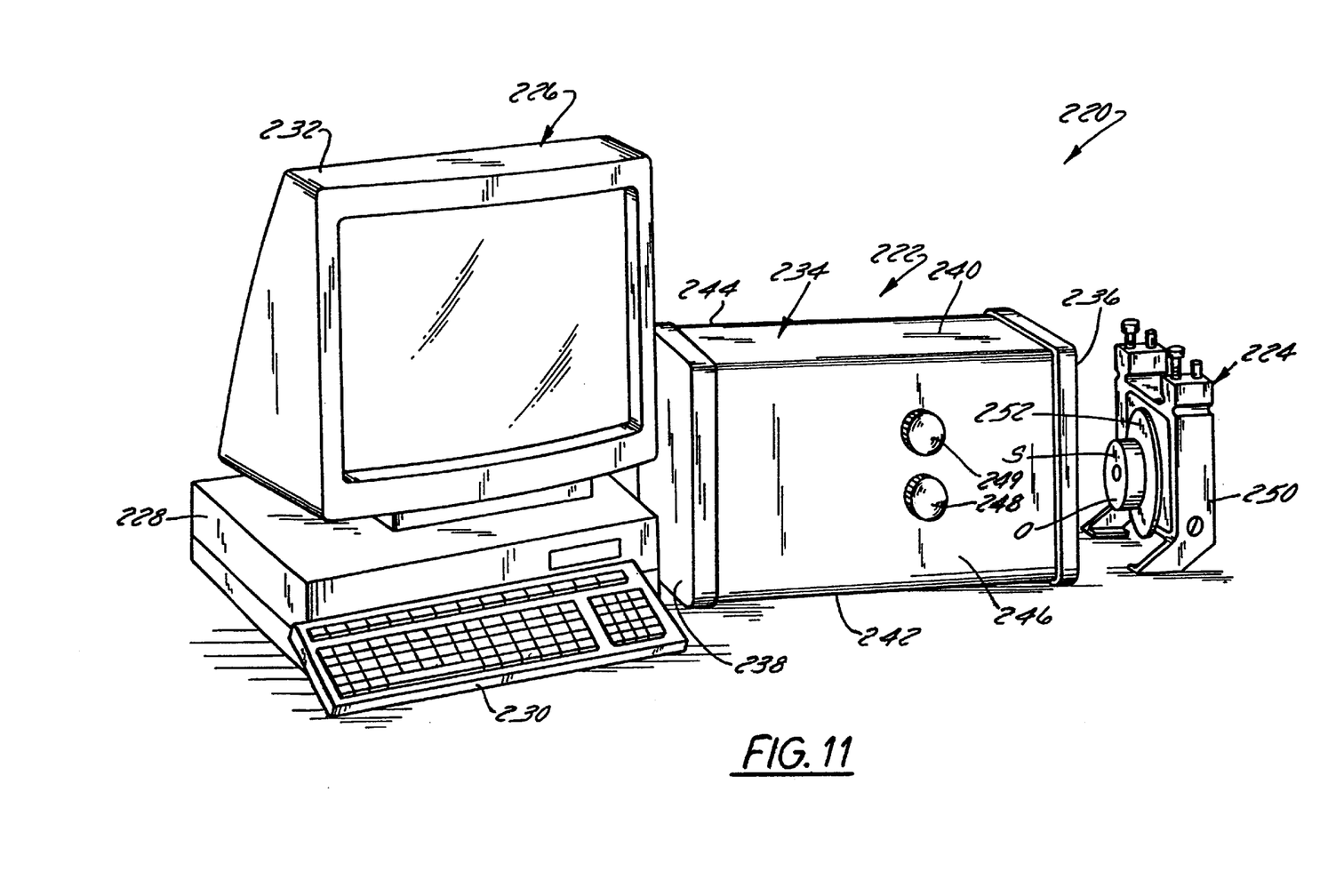
FIG. 11 is a perspective view of a GDI instrument constructed in accordance with a second embodiment of the invention in which a removable aperture-bearing element is disposed between the optical assembly of the GDI instrument and an imaging device.
Figures 12, 13:
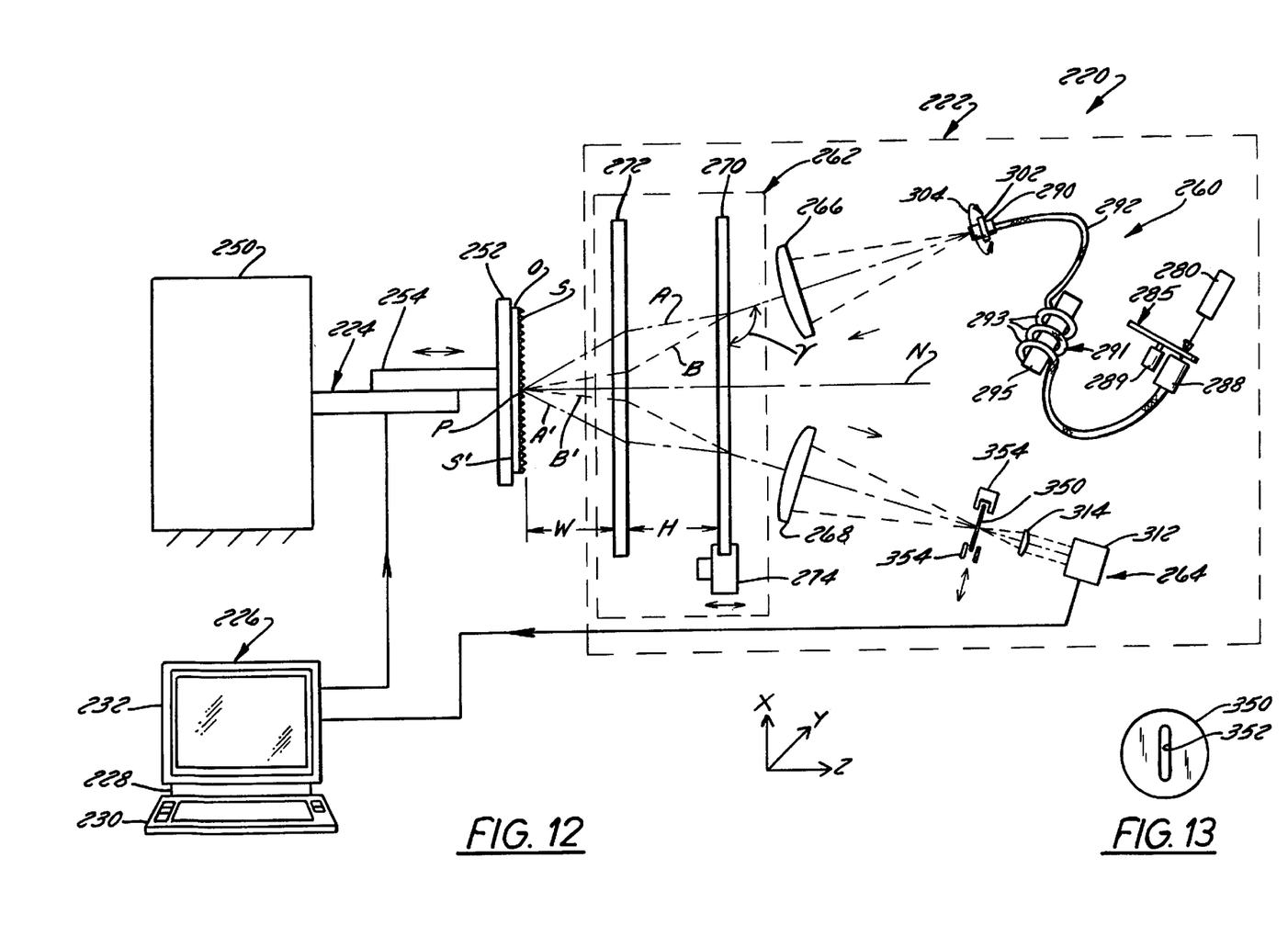
FIG. 12 schematically illustrates the operative components of the GDI instrument of FIG. 11.
FIG. 13 is a plan view of the imaging device aperture-bearing element of FIG. 12.

Specifically, referring to FIGS. 11 and 12, a GDI instrument 220 is illustrated that differs from the GDI instrument 20 of FIGS. 1–6 only in that an additional movable element 350 bearing an elongated imaging device aperture 352 is disposed upstream of the imaging device. Components of the instrument 220 of FIGS. 11 and 12 corresponding to components of the instrument 20 of FIGS. 1–6 are designated by the same reference numerals, incremented by 200. Referring initially to FIG. 11, the GDI instrument 220 therefore includes a mainframe 222, a test object support stand 224, and a computer 226. The computer 226 includes a casing 28 that houses a processor, a RAM, a ROM, etc., a keyboard 230 for entering data, and a monitor 232. The mainframe 222 comprises an enclosed casing 234 that includes front and rear end walls 236 and 238, a top side wall 240, a bottom side wall 242, a left side wall 244, and a right side wall 246. First and second adjustment knobs 248 and 249 are rotatably mounted on and extend outwardly from the right side wall 246. The test object support stand 224 includes a stationary base 250, a support bed 252, and a scanning stage 254, best seen in FIG. 12. Also best seen in FIG. 12 are a light generator 260, a diffraction grating assembly 262, an imaging device 264, a first collimating or focusing lens 266 disposed between the light generator 260 and the diffraction grating assembly 262, and a second collimating lens 268 disposed between the diffraction grating assembly 262 and the imaging device 264.

The diffraction grating assembly 262 includes first and second diffraction gratings 270 and 272 which extend in respective XY planes and which are spaced from one another in the Z direction by a distance H such that the zero OPD position of the profiled surface S is spaced a distance W from the diffraction grating assembly 262. The first grating 270 can be translated in the Z direction via a Z stage translator 274 to facilitate PSI analysis.

The light generator 260 includes a light source 280 and a multimode fiber assembly 282 including a multimode fiber optic bundle encased in a cladding 292, an inlet element 288, a speckle randomizer 285, a discharge element 290, and a mode mixer 291. As in the first embodiment, the shape of the inlet aperture of the inlet element 288 matches the discharge aperture of the light source 280, and the discharge aperture of the outlet element 290 comprises an elongated slot the effective length of which can be adjusted by rotating the discharge element 290 via operation of a knob (not shown in this embodiment).

The element 350 may comprise any device which is capable of bearing the aperture 352 and of being selectively movable into a position in which the aperture 352 constrains light reflected from a rough surface S of a test object O to follow a path leading to the imaging device 264. In the illustrated embodiment, the element 350 comprises a relatively flat disc that is mounted in a slotted support structure 354. The aperture 352 that is borne by the disc 350 should be relatively long and as narrow as possible to optimize the fringe contrast but should not be so narrow that it unacceptably reduces the amount of light received by the imaging device 264. The illustrated aperture 352 is approximately 10 mm long and approximately 2–4 mm wide.

In use, the disc 350 is moved to its operative position, using the knob 349 (FIG. 11), by sliding it within the support structure 354 to a position in which the imaging aperture 352 is located in the reflected light travel path. The narrow aperture 352 increases the equivalent coherence envelope of the imaging device 264 to reduce the detrimental effects of light diffusion. However, because the laterally-small aperture 352 restricts the amount of reflected light reaching the imaging device 264 (which is already a problem with some rough samples), and because a small imaging aperture restricts the range of accepted angles of inclination of smooth surfaces, the disc 350 bearing the aperture 352 should only be utilized when profiling rough surfaces. Otherwise, the disc 350 can be moved out of the reflected light path entirely and/or replaced by an element having a conventional circular aperture. Many changes and modifications may be made to the present invention without departing from the spirit thereof. The scope of some of these changes are discussed above. The scope of other changes will become apparent from the appended claims.

I claim:

1. A geometrically desensitized interferometer for profiling an object surface, said interferometer comprising:

(A) a light generator;

(B) an optical assembly which is disposed between said light generator and the object surface, and which is arranged to receive light from said light generator at a range of incident angles $\Delta\gamma$ relative to a line extending perpendicularly to said optical assembly, and which divides said received light into two beams propagating in two different directions and impinging upon said object surface at essentially the same location but at different incident angles; and (C) an imaging system which is disposed on a common side of said optical assembly with said light generator and which is arranged to receive light transmitted through said optical assembly by said light generator and reflected back through said optical assembly by the object surface so as to produce an interference pattern having a number of equivalent wavelength fringes, wherein one of said light generator and said imaging system further comprises: a collimating lens, an aperture-bearing element, and an adjustment mechanism, wherein said aperture bearing element has an aperture formed therein which shapes light traveling therethrough, said aperture being located substantially at the focal point of said collimating lens and having an effective lateral length which is measured with respect to a direction that is perpendicular to said line, and wherein said adjustment mechanism is selectively operable to adjust the effective lateral length of said aperture.

2. An interferometer as defined in claim 1, wherein said light generator comprises said aperture-bearing element, wherein said aperture bearing element comprises a discharge element, wherein said discharge element includes a discharge aperture which forms said first-mentioned aperture, and wherein the magnitude of $\Delta\gamma$ is dependent upon the effective lateral length of said discharge aperture.

3. An interferometer as defined in claim 2, wherein the magnitude of $\Delta\gamma$ increases with an increases in the effective lateral length of said discharge aperture.

4. An interferometer as defined in claim 3, wherein said adjustment mechanism is operatively coupled to said discharge element so as to selectively rotate said discharge element.

5. An interferometer as defined in claim 4, wherein said adjustment mechanism comprises a rotatable knob.

6. An interferometer as defined in claim 5, wherein said knob is manually rotatable.

7. An interferometer as defined in claim 2, wherein said light generator comprises (1) a light source having a light source discharge aperture and (2) a fiber optic bundle which includes (a) an inlet aperture receiving light from said light source discharge aperture and (b) said discharge element.

8. An interferometer as defined in claim 7, wherein said fiber optic bundle inlet aperture has a shape which at least generally matches a shape of said light source discharge aperture.

9. An interferometer as defined in claim 1, wherein said imaging system comprises an imaging device and said aperture-bearing element disposed between said optical assembly and said imaging device, and wherein said aperture shapes light entering said imaging device from said optical assembly to constrain the light to travel to said imaging device.

10. An interferometer as defined in claim 9, wherein said adjustment mechanism selectively removes said aperture-bearing element from the path of the light entering said imaging device.

11. An interferometer as defined in claim 7, further comprising a speckle randomizer disposed adjacent one of an inlet and an outlet of said fiber optic bundle.

12. An interferometer as defined in claim 11, wherein said speckle randomizer comprises a rotatable diffusion element.

13. An interferometer as defined in claim 7, further comprising a mode mixer which mixes propagation modes within said fiber optic bundle.

14. An interferometer as defined in claim 13, wherein said mode mixer comprises a coiled section of said fiber optic bundle.

15. An interferometer as defined in claim 1, wherein said optical assembly comprises a diffraction grating assembly.

16. A geometrically desensitized interferometer for profiling an object surface, said interferometer comprising:

(A) a light generator;

(B) a diffraction grating assembly which is disposed between said light generator and the object surface and which is arranged to receive light from said light generator at a range of incident angles $\Delta\gamma$ relative to a line extending perpendicularly to said diffraction grating assembly; and (C) an imaging device which is disposed on a common side of said diffraction grating assembly with said light generator, which is spaced laterally from said light generator with respect to said line, and which is arranged to receive light transmitted through said diffraction grating assembly by said light generator and reflected back through said diffraction grating assembly by the object surface so as to produce a number of equivalent wavelength fringes, wherein said light generator further comprises: a light source, an aperture-bearing element, and an adjustment mechanism, wherein said aperture bearing element is disposed between said diffraction grating assembly and said light source and has a discharge aperture formed therein which shapes light traveling therethrough, said discharge aperture having an effective lateral length which is measured with respect to a direction that is perpendicular to said line, wherein the number of equivalent wavelength fringes is dependent upon the magnitude of $\Delta\gamma$ and the magnitude of $\Delta\gamma$ is dependent upon the effective lateral length of said light generator discharge aperture, and wherein said adjustment mechanism is selectively operable to adjust the effective lateral length of said discharge aperture.

17. A geometrically-desensitized interferometer for profiling an object surface, said interferometer comprising:
(A) a light generator;
(B) a diffraction grating assembly which is disposed between said light generator and the object surface and which is arranged to receive light from said light generator at a range of incident angles $\Delta\gamma$ relative to a line extending perpendicularly to said diffraction grating assembly;
(C) an imaging device which is disposed on a common side of said diffraction grating assembly with said light generator, which is spaced laterally from said light generator with respect to said line, and which is arranged to receive light transmitted through said diffraction grating assembly by said light generator and reflected back through said diffraction grating assembly by the object surface so as to produce a number of equivalent wavelength fringes; and
(D) an aperture-bearing element which is disposed between said diffraction grating assembly and said imaging device and which has an elongated imaging aperture formed therein which shapes light traveling therethrough, said aperture-bearing element being selectively movable to a position in which light travels to said imaging device from said diffraction grating assembly without passing through said imaging aperture.

18. A method of adjusting the effective coherence depth of a geometrically-desensitized interferometer, said interferometer including a light generator, an optical assembly, and an imaging device which is disposed on a common side of said optical assembly with said light generator, said method comprising the steps of:
(A) transmitting light (1) from a discharge aperture of said light generator and onto said optical assembly at a range of incident angles $\Delta\gamma$ with respect to a line extending perpendicularly with respect to said optical assembly, (2) through said optical assembly, (3) to a surface of an object as two beams that impinge on said surface at a common location but at different incident angles, (4) back through said optical assembly, and (5) to said imaging device as an interference pattern having a number of equivalent wavelength fringes which is dependent on the magnitude of $\Delta\gamma$; and
(B) altering the magnitude of $\Delta\gamma$ to alter the number of equivalent wavelength fringes and the equivalent coherence depth of said interferometer.

19. A method as defined in claim 18, wherein said light generator discharge aperture has an effective lateral length which is measured with respect to a direction that is perpendicular to said line, and wherein the magnitude of $\Delta\gamma$ is dependent upon the effective lateral length of said light generator discharge aperture.

20. A method as defined in claim 19, wherein the altering step comprises increasing the magnitude of $\Delta\gamma$ by increasing the effective lateral length of said light generator discharge aperture.

21. A method as defined in claim 20, wherein said light generator discharge aperture comprises an elongated slot which is formed in a discharge element of said light generator, and wherein the altering step comprises rotating said discharge element to vary the orientation of said elongated slot relative to said line.

22. A method as defined in claim 21, wherein the altering step comprises rotating a knob which is operatively coupled to said discharge element.

23. A method as defined in claim 22, wherein the rotating step is performed manually.

24. A method as defined in claim 18, wherein said light generator comprises (1) a light source having a light source discharge aperture formed therein and (2) a fiber optic bundle which includes (a) an inlet aperture receiving light from said light source discharge aperture and (b) said light generator discharge aperture, and wherein at least 50% of light exiting said light source discharge aperture is transmitted through said inlet aperture and into said fiber optic bundle.

25. A method as defined in claim 24, wherein at least 60% of light exiting said light source discharge aperture is transmitted through said inlet aperture and into said fiber optic bundle.

26. A method as defined in claim 24, further comprising randomizing speckle in light emitted from said fiber optic bundle.

27. A method as defined in claim 26, wherein the randomizing step comprises rotating a diffusion element through a light beam entering said fiber optic bundle.

28. A method as defined in claim 24, further comprising mixing propagation modes within said fiber optic bundle.

29. A method as defined in claim 28, wherein the mixing step comprises transmitting light through a coiled section of said fiber optic bundle.

30. A method of adjusting the effective coherence depth of a geometrically desensitized interferometer, said interferometer including (1) a light generator including a light source and a fiber optic bundle, (2) a diffraction grating assembly, and (3) an imaging device which is disposed on a common side of said diffraction grating assembly with said light generator and which is spaced laterally from said light generator with respect to a line extending perpendicularly with respect to said diffraction grating assembly, said method comprising the steps of:
(A) transmitting light from a discharge aperture of said light source to an inlet aperture of said fiber optic bundle such that at least 60% of light exiting said light source discharge aperture is transmitted through said inlet aperture and into said fiber optic bundle;
(B) transmitting light (1) from an elongated slot of said fiber optic bundle serving as a light generator discharge aperture and onto said diffraction grating assembly at a range of incident angles $\Delta\gamma$ with respect to said line, (2) through said diffraction grating assembly, to a surface of an object, (3) back through said diffraction grating assembly, and (4) to said imaging device as an interference pattern, said interference pattern having a number of equivalent wavelength fringes, the number being is dependent on the magnitude of $\Delta\gamma$, and wherein the magnitude of $\Delta\gamma$ is inversely related to an effective lateral length of said elongated slot, wherein said effective lateral length is measured with respect to a direction that is perpendicular to said line; and
(C) rotating said discharge element of said fiber optic bundle thereby to alter the effective lateral length of said elongated slot and hence the magnitude of $\Delta\gamma$, the number of equivalent wavelength fringes, and an equivalent coherence depth of said interferometer.

31. A geometrically-desensitized interferometer for profiling an object surface, said interferometer comprising:
(A) a light generator which comprises
  (1) a light source having a light source discharge aperture, and
  (2) a fiber optic bundle which includes (a) an inlet aperture receiving light from said light source discharge aperture and (b) a discharge element, wherein said fiber optic bundle inlet aperture has a shape which at least generally matches a shape of said light source discharge aperture;
(B) an optical assembly which is disposed between said discharge element and the object surface, which is arranged to receive light from said light generator, and which divides said received light into two beams propagating in two different directions and impinging upon said object surface at essentially the same location but at different incident angles;
(C) an imaging device which is disposed on a common side of said optical assembly with said light generator and which is arranged to receive light transmitted through said optical assembly by said light generator and reflected back through said optical assembly by the object surface so as to produce an interference pattern.

32. A geometrically-desensitized interferometer for profiling an object surface, said interferometer comprising:
(A) a light generator including a light source;
(B) an optical assembly which is disposed between said light generator and the object surface, and which divides said received light into two beams propagating in two different directions and impinging upon said object surface at essentially the same location but at different incident angles;
(C) an imaging device which is disposed on a common side of said optical assembly with said light generator, which is arranged to receive light from said light generator, and which is arranged to receive light transmitted through said optical assembly by said light generator and reflected back through said optical assembly by the object surface so as to produce an interference pattern; and
(D) a speckle randomizer which enhances randomization of light distributed from said light source, said speckle randomizer being located between said light source and said optical assembly.

33. An interferometer as defined in claim 32, wherein said speckle randomizer comprises a rotatable diffusion element.

34. A geometrically-desensitized interferometer for profiling an object surface, said interferometer comprising:
(A) a light generator which comprises
  (1) a light source having a light source discharge aperture, and
  (2) a fiber optic bundle which includes (a) an inlet aperture receiving light from said light source discharge aperture and (b) a discharge element;
(B) an optical assembly which is disposed between said discharge element and the object surface, and which divides said received light into two beams propagating in two different directions and impinging upon said object surface at essentially the same location but at different incident angles;
(C) an imaging device which is disposed on a common side of said optical assembly with said light generator, which is arranged to receive light from said light generator, and which is arranged to receive light transmitted through said optical assembly by said light generator and reflected back through said optical assembly by the object surface so as to produce an interference pattern; and
(D) a mode mixer which mixes propagation modes within said fiber optic bundle.

35. An interferometer as defined in claim 34, wherein said mode mixer comprises a coiled section of said fiber optic bundle.

* * * * *